United States Patent [19]

Price et al.

[11] 3,751,857

[45] Aug. 14, 1973

[54] LOADER MECHANISM FOR A MACHINE TOOL

[75] Inventors: Ralph E. Price; Dudley V. Bickford, both of Waynesboro, Pa.

[73] Assignee: Landis Tool Company, Waynesboro, Pa.

[22] Filed: June 24, 1971

[21] Appl. No.: 156,250

[52] U.S. Cl............................. 51/215 H, 214/1 BD
[51] Int. Cl............................................. B24b 47/02
[58] Field of Search...................... 51/215 H, 215 R; 214/1 BD

[56] References Cited
UNITED STATES PATENTS
3,619,951  11/1971  Kikuchi......................... 51/215 R X

*Primary Examiner*—Othell M. Simpson
*Attorney*—Joseph R. Spalla

[57] ABSTRACT

An automatic loader (11) for a machine tool, such as a concentric grinding machine (10), wherein the arcuate movement of a loader arm (16) carries ring-like workpieces (W) from a loading station (12) to a grinding station (13). The loader arm (16) is axially displaced to strip the ground workpiece (W) from a loader stud (21) at a precise angular position to discharge a workpiece at an unloading station (14), while the loader arm (16) is being raised from the grinding station (13) to the loading station (12) to engage the next workpiece (W). The axial movement occurs when the fluid being discharged from a first hydraulic motor (24), which effects the raising of the loader arm (16), advances a piston (22) within a displacement cylinder (17) so as to expose a port (26). Thereafter, the fluid being discharged from the hydraulic motor (24) is directed to a second hydraulic motor (18) to move the loader arm (16) axially and strip the workpiece (W) therefrom. The loader arm (16) is returned to its original axial position at the loading station (12) to engage an unground workpiece (W) in preparation for the next cycle of operation.

13 Claims, 6 Drawing Figures

INVENTORS.
RALPH E. PRICE
DUDLEY V. BICKFORD

Patented Aug. 14, 1973

INVENTORS
RALPH E. PRICE
DUDLEY V. BICKFORD

BY David Ulrey
ATTORNEY

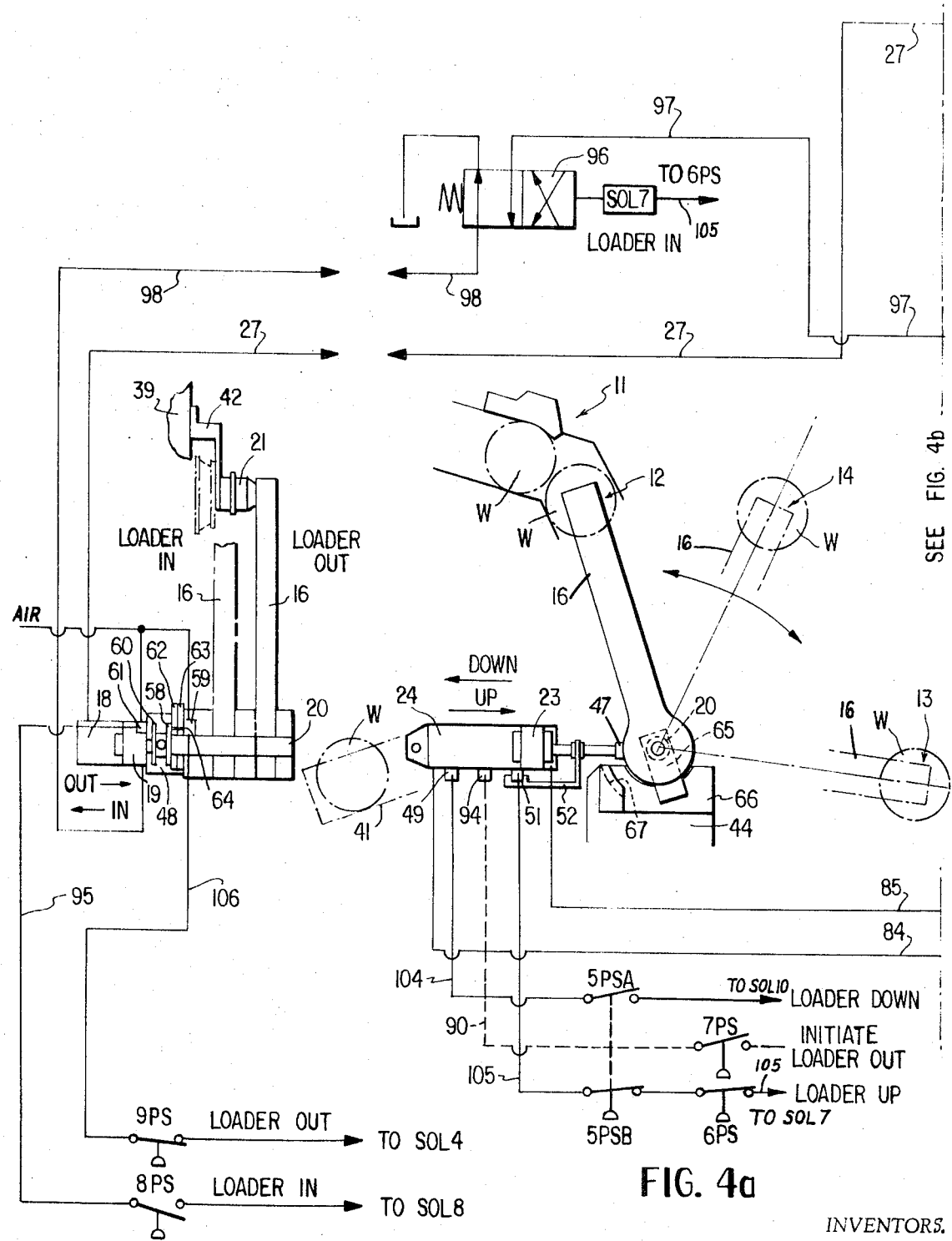

LOADER MECHANISM FOR A MACHINE TOOL

BACKGROUND OF THE INVENTION

1. Field of the Invention

This invention relates in general to an improved loader mechanism for a machine tool, such as a concentric grinder, wherein one or more surfaces of ring-like workpieces, such as roller bearings, are ground. Machines of this type usually have a swinging-type loader arm which carries the workpieces into and out of the grinding position automatically. The workpieces are supported on a loader stud which is secured to the outer end of the arm. The downward movement of the arm places a workpiece against the faceplate of a magnetic chuck, which rotates the workpiece and retains the peripheral surface against the shoes of a work support assembly in a conventional manner.

2. Description of the Prior Art

Prior to this invention, the swinging-type loader arm was normally advanced, for example, in a clockwise direction from a discharge position to a loading station, and then further in a clockwise direction to the grinding station. In the Balsiger U.S. Pat. No. 2,874,518, granted Feb. 24, 1959, a stationary camming element was used to engage the workpiece when the loading arm was in the retracted position to slide the workpiece off its supporting arbor. The swinging arm was then moved to the loading position where it made a second stop to pick up the next workpiece. The arm had a drive pinion connected to the end opposite from the work engaging end which was in engagement with a rack. The position of the rack was controlled by a suitable hydraulic motor.

In another prior device as disclosed in the Snyder U.S. Pat. No. 2,826,017, granted Mar. 11, 1958, there was a similar arrangement having in series, a discharge, a loading, and a grinding station. In that apparatus, a stationary camming element engaged an intermediate stripper which slid the workpiece off the arbor at the discharge station. The arm then rotated to the loading station where it again stopped to pick up the next workpiece. Both of the above designs had the disadvantage of requiring the loading arm to make separate stops for discharge and reloading, thus increasing the cycle time and decreasing the output of the machine.

There have also been arrangements where the discharge station was at the same angular position as the loading station. In such an arrangement, the magazine holding the supply of workpieces was swivelled or moved axially out of the path of the loading arm in order to permit the discharge of a completed workpiece. The loading magazine was then moved back toward the loading arm so as to position the next workpiece on the supporting arbor. This arrangement had the disadvantage of requiring the magazine to be moved back and forth.

In still another previously known grinding machine of this type, the discharge station was angularly positioned between the loading and grinding station. However, in this apparatus, the loading arm came to a complete stop at the discharge station. A signal from an electrical switch was then made to move the work supporting arbor axially, in order to strip the workpiece therefrom. This arrangement, of course, had the disadvantage of requiring the loading arm to make a first stop at the discharge station, and then a subsequent stop at the loading station.

As can be seen from the above description, the previously known arrangements have required either the movement of the work holding magazine during the unloading and loading cycle, or required the stopping of the loading arm in two separate positions, one for discharge, and one for loading. Both of these problems have been overcome by the instant invention.

SUMMARY OF THE INVENTION

In accordance with the invention, there is provided an automatic loader for a machine tool, such as a concentric grinding machine for grinding ring-like workpieces. The loader includes a pivotable or swinging-type loader arm and a workpiece supporting loader stud. The arm is positioned in seriatim in a loading station, a grinding station, and then an unloading station, which is located at an angular position between the loading and grinding stations. A first hydraulic means is provided to pivot the loader arm at the completion of a grinding cycle, and move the stud from the grinding station to the loading station. A second hydraulic means which is responsive to and cooperates with the first hydraulic means, shifts the loader arm axially at the precise angular position of the unloading station during the pivotal movement of the arm to strip a workpiece from the loader stud prior to the loader arm reaching the loading station.

In the preferred embodiment, the first hydraulic means includes a hydraulic motor, the discharge of which is connected to a displacement cylinder. When a predetermined amount of fluid has been discharged from the hydraulic motor, a port is exposed within the displacement cylinder to by-pass further discharged fluid to a second hydraulic motor, which then shifts the loader arm axially to strip the workpiece therefrom.

A primary object of the invention is to provide facilities for removing a finished workpiece from the loading arm while the arm is moving from the grinding station toward the loading station.

Another object is to provide a displacement cylinder to control the discharge of ring-like workpieces from a swinging-type loader arm at a precise angular position between the loading and grinding station.

Another object is to provide an automatic loader with means to remove a workpiece by the longitudinal or axial movement of the loader arm which occurs at a precise position during the pivotable movement of the arm toward the loading station.

Another object is to prevent longitudinal or axial movement of the loading arm unless the arm has been accurately moved a predetermined amount to prevent the unloading of a workpiece at an improper position.

Another object is to vary the amount of stroke on the cylinder which unloads a workpiece by inserting or interchanging spacing members which control the total amount of allowable movement to compensate for the variations in the width of the workpieces.

BRIEF DESCRIPTION OF THE DRAWINGS

With the above and other objects in view that will hereinafter appear, the nature of the invention will be more clearly understood by reference to the following detailed description, the appended claims and the views illustrated in the accompanying drawings, wherein:

FIGS. 4a and 4b is a front view of the loading mechanism, and a schematic view showing the hydraulic means for operating the loader; and FIG. 5 is an end view of the loading mechanism showing the loader arm in the OUT position, with hydraulic lines leading to the schematic view, as shown in FIG. 4b.

DESCRIPTION OF THE PREFERRED EMBODIMENTS

Figure 1:
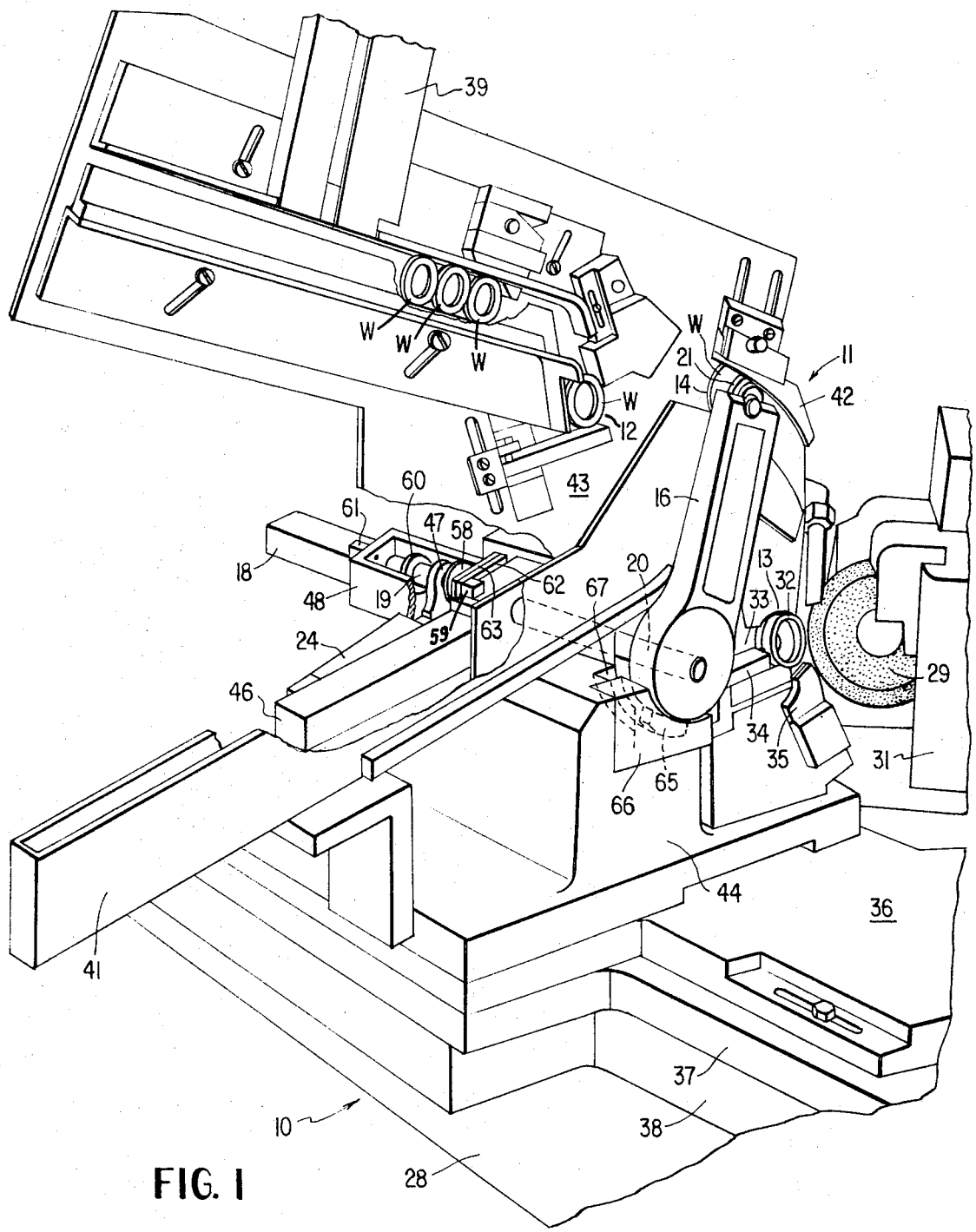
FIG. 1 is a perspective view of a grinding machine embodying the principles of the invention, showing the automatic loader arm in the unload position.

Referring now to the drawings, and particularly to FIG. 1, there is illustrated a perspective view of a concentric grinding machine 10, which uses an automatic loader 11 to load and unload ring-like workpieces W in a rapid manner. It is to be understood that the instant loader mechanism can be used with other machines, and that the concentric grinding machine 10 is shown by way of an example and not as a limitation on the invention.

The workpieces W are carried from a loading station 12 to a grinding station 13, and from the grinding station 13 to an unloading station 14, at a precise angular position therebetween. The workpieces W are transferred between the stations 12 and 13 by the arcuate movement of a swinging-type loader arm 16. A ground workpiece W is discharged at the unloading station 14 by axially or longitudinally displacing the arm 16 as it passes a precise angular position, as the arm 16 is being raised from the grinding station 13 to the loading station 12. The means for stripping the workpiece W from the arm 16 is rendered operable by the axial movement of the arm 16, the stripping apparatus being described more fully hereinafter.

The axial movement of the arm 16, as shown in FIG. 5, is effected by fluid pressure which is directed from the head end of a displacement cylinder 17 (FIG. 4b) to the head end of a -loader IN-OUT- cylinder 18 (FIG. 5). The rod end of a piston 19, of the cylinder 18, is connected to a shaft 20 which carries the arm 16. Movement of the piston 19 to the right (FIG. 5) effects the stripping of a workpiece W from a loader stud 21, which is secured to the outer end of the arm 16.

The precise angular position at which the arm 16 is moved axially for removing a workpiece W, is determined by the positive displacement of a piston 22 (FIG. 4b) within the displacement cylinder 17. The movement of the piston 22 is controlled by the fluid pressure being discharged from the rod end of the cylinder 24 as the arm 16 is being raised.

Thus, the cylinder 17 and the piston 22 act as a meter to measure the fluid output from the cylinder 24, which provides a direct measurement of the arcuate movement of the arm 16, since the starting position of the arm 16 at the grinding station 13 is a known constant. The fluid displaced from the cylinder 24 provides an accurate indicator for determining the angular position of the arm 16. Once the piston 22 is advanced to the left (FIG. 4b) by a predetermined amount, a port 26 is opened to direct fluid being discharged from the rod end of the cylinder 24 to the head end of the cylinder 18, through a line 27. This causes the axial displacement of the arm 16 to discharge a ground workpiece W. The arm 16 will be at a precise angular position when the axial movement occurs, because the volume of fluid required to provide positive displacement of the piston 22 is determined by the fluid discharged from the rod end of the cylinder 24, when a piston 23 enclosed therein, is advanced to the right (FIG. 4a), to raise the arm 16. The unloading of a workpiece W occurs without stopping the angular movement of the arm 16 and the cycle time for unloading and loading a workpiece W, is shortened.

The general environmental structure of a concentric grinding machine 10 is shown in FIG. 1, which includes a suitable machine base 28 on which there are mounted a grinding wheel 29, a wheel support 31, and grinding wheel driving elements similar to that disclosed in U.S. Pat. No. 2,694,883, granted Nov. 23, 1954. The details of the feed and positioning mechanism are similar to that disclosed in U.S. Pat. application, Ser. No. 45,829, filed June 12, 1970. Only those elements of the grinding machine 10 which relate to this invention will be described below.

Basically, in the concentric grinding machine 10, ring-like workpieces W are held by a magnetic chuck 32 which is secured to a headstock 33 in a conventional manner. Rotation of the chuck 32 will center the workpiece W in an offset relation to hold the periphery of the workpiece W against supporting shoes 34 and 35, as shown in FIG. 1.

The headstock 33 is secured to a sub-table 36 which is longitudinally positioned to align the periphery of a workpiece W with the grinding wheel 29. The sub-table 36 is secured to a swivel table 37 which is pivotably mounted to a slide member 38, and the slide member 38 is secured to the machine base 28. The swivel table 37 is locked in a position to provide the proper angular alignment between the workpiece W and the grinding wheel 29.

The automatic loader 11 includes an adjustable loading chute 39, a discharge chute 41, and a stripper bar 42, each being secured to the loader chute base 43, which is secured to a loader base 44. The loader base 44 is secured to the subtable 36 in a longitudinal position so that the arm 16 just clears the chuck 32, when a workpiece W is advanced to the grinding station 13 during the downward movement of the arm 16.

The workpieces W are carried by the loader stud 21 (FIGS. 1 and 2) which is interchangeable to accommodate varying sizes of workpieces. The diameter of the loader stud 21 should be slightly smaller than the bore of the workpiece W to allow the workpieces W to rest against the shoes 34 and 35 (FIGS. 1 and 2) which support the outside diameter of the workpieces W during the grinding operation.

The shaft 20 which carries the arm 16 is housed within the loader base 44. The arm 16 is raised or lowered by movement of the piston 23 within the cylinder 24. The head end of the cylinder 24 is pivotably secured to a bracket 46 as shown in FIG. 1, which is secured to the loader base 44. The rod end of the piston 23 is secured to a member 47 which is locked to the shaft 20. This arrangement allows the rod end of the cylinder 24 to be moved axially with the shaft 20 when the piston 19 is advanced or retracted to position the arm 16 in the IN or OUT position (FIG. 5). The cylinder 18 is secured to a bracket 48 (FIGS. 1 and 5) which is removably secured to the loader base 44, and the rod end of the piston 19 is coupled to the shaft 20.

Figure 3:
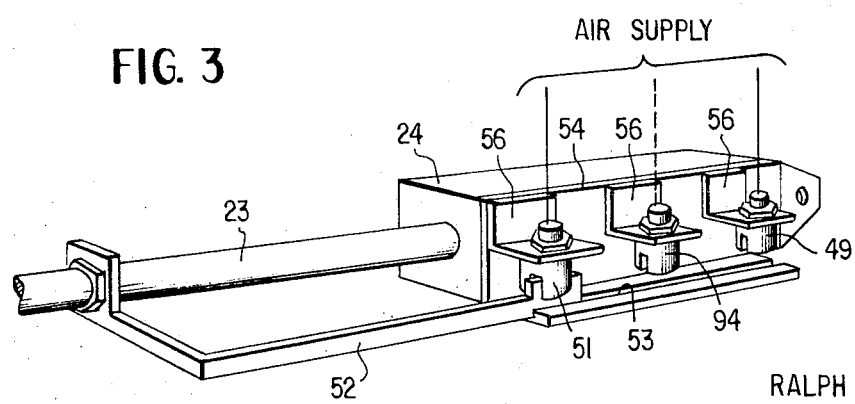
FIG. 3 is a perspective view showing the fluidic control means for determining the angular positions of the loader arm.

The precise angular position of the arm 16 at the loading station 12 and the grinding station 13 (FIGS. 1 and 4a) is controlled by a fluidic switch arrangement, as shown in FIG. 3. Signals are actuated when air pressure from the jet sensors 49 and 51 are interrupted by a wand 52, which is secured to the rod end of the piston 23. The wand 52 is slidably supported in the track 53 of a guide strip plate 54 which is secured to the side of the cylinder 24. The jet sensors 49 and 51 are secured to plates 56 which are secured to the plate 54.

A switch member 58 (FIG. 5) is secured to the shaft 20, which blocks the air from a jet sensor 59 when the arm 16 is in the OUT position. A switch member 60 is secured to the shaft 20 to block the air from a jet sensor 61 which is mounted on the cylinder 18, to provide a signal when the arm 16 is in the IN position.

Spacing members 62 and 63 are inserted in the bracket 48 to limit the amount of axial movement provided by movement of the piston 19 to the right (FIG. 4a). The total width of the selected spacing members 62 and 63 limits the axial outward stroke required to extract the loader stud 21 completely from the bore of a particular workpiece W. An orifice 64 is provided in each of the spacing members 62 and 63 so that the air from the jet sensor 59 is directed through the spacing members 62 and 63 to provide a signal when the arm 16 is in the OUT position.

An interlock plate 65 (FIGS. 1 and 4a) is secured to the rear side of the arm 16. A latch member 66 which is mounted on the loader base 44, includes a circular slot 67 to allow the interlock plate 65 to be angularly positioned by movement of the arm 16. However, the slot 67 forms a mechanical obstruction to prevent axial movement of the arm 16 unless the arm 16 is positioned in the unloading station (FIG. 1).

It should be pointed out that the wheel support 31 (FIGS. 1 and 2) is retracted when an "on-size" signal from a gage (not shown) is obtained in a conventional manner. The loader arm 16 is raised at the completion of the wheel support retraction movement, and a workpiece W is carried from the grinding station 13 to the unloading station 14. When the arm 16 is positioned axially to the OUT position as shown in FIG. 5, the workpiece W is stripped from the loader stud 21 by the stripper bar 42, and unloaded down a discharge chute 41 (FIG. 1), while the arm 16 continues to be raised to the loading station 12.

The operation of the automatic work loader 11 is hydraulically operated by the controlled flow of fluid to the head end of the cylinder 24 which raises the arm 16. The axial movement of the arm 16 occurs when the arm 16 has been raised to the unloading station 14 at a precise angular position. The axial movement is determined by the movement of the piston 22 within the displacement cylinder 17 which provides a positive time delay for the arm 16 to be raised to the unloading station 14. Movement of the piston 22 to the left (FIG. 4b) is effected by fluid being discharged from the rod end of the cylinder 24. The volume which must be filled to reposition the piston 22 a predetermined amount can be controlled by adjusting a threaded member 69, which is in threaded engagement and locked to the displacement cylinder 17.

Figure 4B:
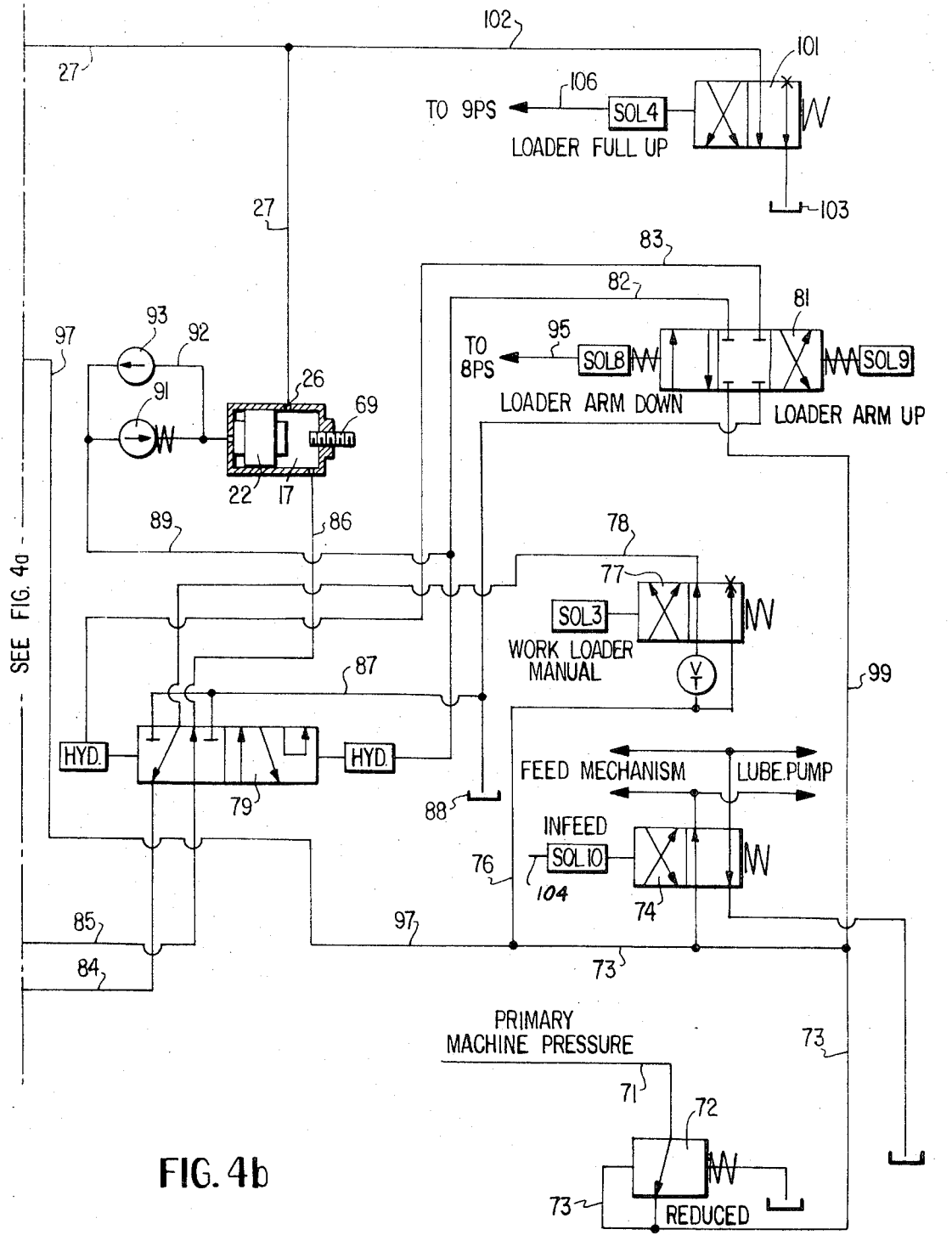

The hydraulic system as shown in FIGS. 4a, 4b, and 5, includes a source of hydraulic fluid under pressure which is delivered through a line 71. When the primary supply of fluid in the system is relatively high, a check valve 72 is used to direct a lower predetermined pressure to the hydraulic system. A line 73 directs fluid from the valve 72 to a control valve 74, and a line 76 branching from the line 73 directs fluid pressure to a control valve 77.

The control valve 74 is shifted to the right (FIG. 4b) against spring pressure when the -infeed solenoid- SOL 10 is energized. Fluid pressure is then directed to the wheelhead lubricating pump (not shown), to effect the infeed movement of the wheel support 31 and the grinding wheel 29.

The control valve 77 is shifted to the right (FIG. 4b) against spring pressure when the -work loader solenoid- SOL 3 is energized. Fluid pressure is then directed from the line 76 through the valve 77 and through a line 78 which directs fluid from the valve 77 to a pilot valve 79.

The pilot valve 79 is shifted to the right or left (FIG. 4b), depending upon the position of a loader arm control valve, which controls the flow of fluid through line 82 or 83. The valve 81 is positioned to the right (FIG. 4b) when a -loader arm-down solenoid- SOL 8 is energized, or positioned to the left when a -loader arm-up solenoid- SOL 9 is energized. It is to be understood that the -loader arm-down solenoid- SOL 8 cannot be energized unless the -loader arm-up solenoid- SOL 9 is de-energized and that the reverse order is also true.

The -work loader solenoid- SOL 3 is energized when the machine is started; therefore, the fluid from the lines 71, 73 and 76 is directed through the valve 77, and the line 78 directs fluid through the pilot valve 79, and through a line 84 connected to the head end of the cylinder 24. The piston 23 within the cylinder 24 is shifted to the right (FIG. 4a) and the loader arm 16 is raised to the loading station 12 in preparation for loading a workpiece W.

During the upward movement of the arm 16, discharged fluid from the rod end of the cylinder 24 is directed through a line 85, which is connected to the pilot valve 79, and through a line 86 which connects the pilot valve 79 to the head end of the displacement cylinder 17. The piston 22 is shifted to the left (FIG. 4b) until the port 26 within the cylinder 17 allows fluid to be directed to the head end of the cylinder 18 (FIG. 5) through the line 27. The loader arm 16 is moved axially to the OUT position to unload a ground workpiece W, which is then unloaded down the discharge chute 41.

Referring now to FIG. 4b, a line 87 which connects the pilot valve 79 to the valve 81 includes a drain 88, which allows the fluid from the head end of the cylinder 24 to be exhausted through the line 84 when the arm 16 is lowered. The line 86 from the head end of the displacement cylinder 17 is also connected to the drain 88 when the valve 79 is shifted to the left (FIG. 4b).

A line 89 which branches from the line 82 is connected to the rod end of the cylinder 17. A check valve 91 is included in the line 89 to control the direction of fluid to the cylinder 17. A line 92 provides a by-pass around the check valve 91 and a check valve 93 is included in the line 92 to control the direction of fluid being exhausted from the rod end of the cylinder 17 when the loader arm 16 is raised.

Referring now to FIGS. 3 and 4a, it should be understood that an additional jet sensor 94 can be positioned between the jet sensors 49 and 51. When this arrangement is used, the pilot valve 79, the displacement cylinder 17, a -loader in solenoid- SOL 7, and a -loader full-up solenoid- SOL 4, would not be required.

The lines 84 and 85 are then connected to the valve 81 and the axial movement of the arm 16 to the right (FIG. 5) is effected when the wand 52 interrupts the jet sensor 94. Pressure in a line 90 is decreased and a -loader-out pressure switch- 7PS closes and fluid is directed to the head end of the cylinder 18, to position the arm 16 in the OUT position (FIG. 5).

OPERATION

Figure 2:
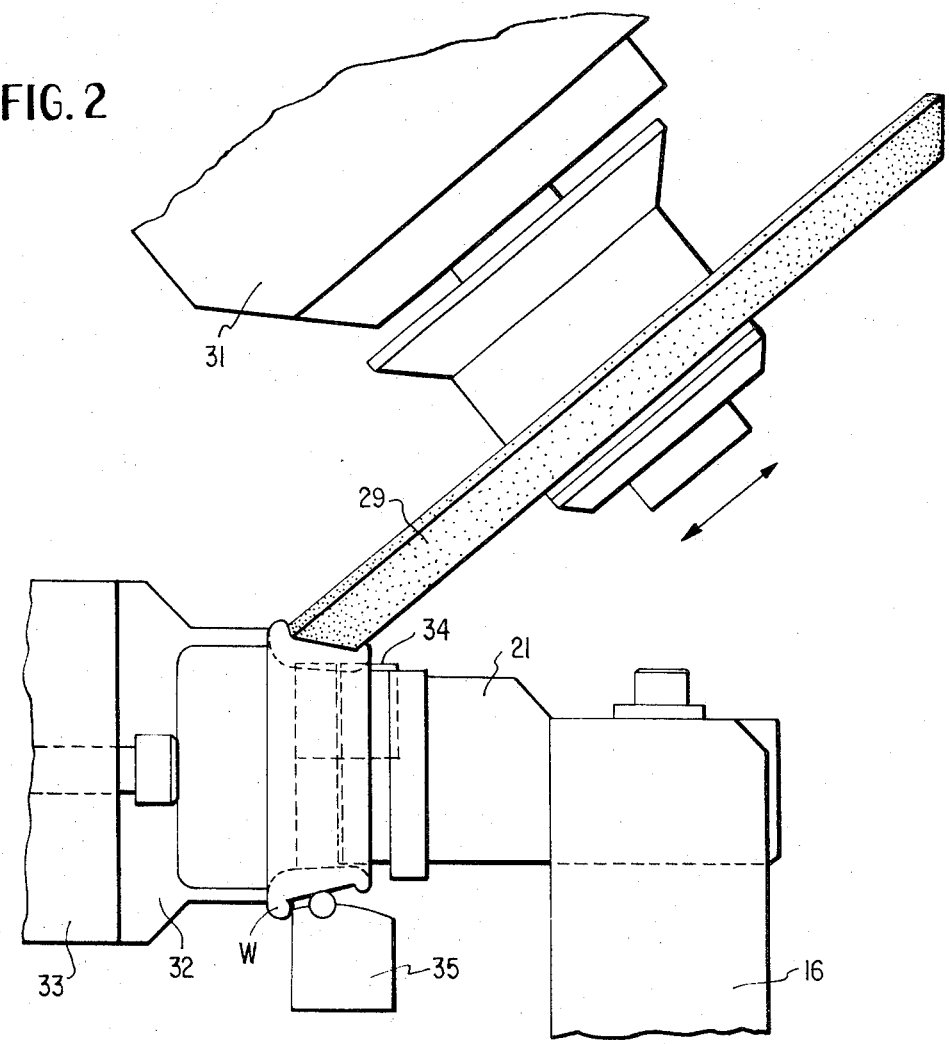
FIG. 2 is a partial top view, showing a workpiece being held against the magnetic chuck and the relative position of the grinding wheel.

The automatic loader 11 which effects the loading of ring-like workpieces W from a loading station 12 to the grinding station 13, and from the grinding station 13 through the unloading station 14 back to the loading station 12, is controlled by the pivotable and axial movement of the swinging-type arm 16. Referring now to FIGS. 4a, 4b, and 5, the hydraulic system is shown which controls the loading and unloading of the workpiece W from the concentric grinding machine 10, as illustrated in FIG. 1. A machine of this type may be used to grind portions of a cylindrical part, such as the face and roller path of a tapered bearing with the outside diameters being supported as shown in FIGS. 1 and 2, or be used to grind the ball tracks of a bearing supported on a work arbor (not shown) when the bore of the bearing has previously been ground.

The actual loading cycle is effected by depressing a cycle start pushbutton (not shown), when the machine is set in the automatic mode. The -loader-in solenoid- SOL 7 is energized through a pressure switch 6PS when the arm 16 is positioned at the loading station 12. The energization of the solenoid SOL 7 shifts a valve 96 to the left (FIG. 4b) and fluid from a line 97, which is connected to the line 73, is directed through the valve 96 and to the rod end of the cylinder 18 (FIG. 5) through a line 98.

The piston 19 (FIG. 5) is advanced to the left or IN position. Movement of the piston 19 effects the axial movement of the arm 16 and the loader stud 21 to the left to engage an unground workpiece W, as shown in FIG. 2.

The clockwise or downward movement of the arm 16 (FIG. 4a) is effected by fluid pressure directed to the rod end of the cylinder 24. This occurs when the -loader arm-down solenoid- SOL 8 is energized by the closing of a pressure switch 8PS (FIG. 5). The pressure switch 8PS is closed when the shaft 20 is moved to the left (FIG. 5), as the switch member 60 blocks the air from the jet sensor 61, and pressure in a line 95 is increased. The valve 81 is shifted to the right as shown in FIG. 4b, and fluid pressure from the lines 71, 73, and 99 is now directed through the valve 81 and through the line 82 to shift the valve 79 to the left (FIG. 4b). Fluid is also directed through the line 89 to reset the piston 22 to the right.

Fluid is now directed through the valves 77 and 79 by the lines 71, 73, 76, and 78, and through the line 85 which is connected to the rod end of the cylinder 24. The piston 23 (FIG. 4a) is shifted to the left, which continues until the wand 52 interrupts the air from the jet sensor 49. A switch 5PSA is closed by decreased pressure in a line 104 to provide a signal that the arm 16 has been lowered to the grinding station 13, and a circuit is completed to energize the magnetic chuck 32, and a switch 5PSB is opened in a line 105.

The -infeed solenoid- SOL 10 is energized by the closing of the switch 5PSA and the grinding wheel 29 is advanced at a rapid infeed rate, a coarse grinding feed rate, and a fine feed rate, by means of a digital feed program until size is reached by a conventional gage (not shown). The grinding wheel 29 is retracted by conventional means when size is reached.

The -loader arm-up solenoid- SOL 9 is energized after the grinding wheel 29 is retracted, and the valve 81 is shifted to the left (FIG. 4b). Fluid pressure is directed from the lines 71, 73, and 99, through the valve 81, and through the line 83, to shift the pilot valve 79 to the right, as shown in FIG. 4b.

Fluid pressure from the lines 71, 73, and 76 is now directed through the valve 77, the line 78, the pilot valve 79, and through the line 84 to the head end of the cylinder 24. The piston 23 is shifted to the right to effect raising of the loader arm 16.

A workpiece W is raised with the counter-clockwise movement of the arm 16, and the arm 16 is axially repositioned at a precise angular position. This position is controlled by the fluid being discharged from the rod end of the cylinder 24, which is directed to the head end of the displacement cylinder 17 through the lines 85 and 86. The piston 23 is shifted to the left (FIG. 4b) until the port 26 allows fluid to be directed to the head end of the cylinder 18 by the line 27. The piston 19 is shifted to the right (FIG. 5) to effect axial movement of the arm 16.

The workpiece W is stripped from the loader stud 21 by the stripper bar 42, which restricts axial movement of the workpiece W when the arm 16 is shifted to the right or the OUT position (FIG. 5), and the workpiece W is unloaded down the discharge chute 41.

The -loader full-up solenoid- SOL 4 (FIG. 4b) is energized when the arm 16 reaches the OUT position which closes a pressure switch 9PS in a line 106 (FIG. 5). A control valve 101 is shifted to the right (FIG. 4b) and fluid from the line 27 and a line 102 is directed to a drain 103 which is connected to the valve 101.

The fluid discharged from the rod end of the cylinder 24 is also directed to the drain 103 through the lines 85, 86, 27, and 102. This arrangement enables the arm 16 to be raised from the unloading station 14 to the loading station 12 to repeat the cycle in a non-interrupted manner.

It is to be understood that only a preferred embodiment of the invention has been specifically illustrated and described, and variations may be made thereto without departing from the invention, as defined in the appended claims.

We claim:

1. An automatic loader for a machine tool for grinding ring-like workpieces, the loader having a pivotally mounted loader arm including a workpiece supporting loader stud which is positioned in seriatim in a loading station, a grinding station and an unloading station, said last station being located at an angular position between the loading and grinding stations, wherein the improvement comprises:

first hydraulic means including a first hydraulic motor having a cylinder and a piston operably engaged with the loader arm for arcuately swinging the loader arm and the loader stud from the grinding station, at the completion of a grinding cycle, to the loading station;

second hydraulic means responsive to the first hydraulic means for shifting the loader arm axially proximate the angular position of the unloading station during the arcuate movement thereof to unload a workpiece prior to the loader arm reaching the loading station, said second hydraulic means including a displacement cylinder having a slidable piston mounted therein in fluid communication with the discharge of said first hydraulic motor, said displacement cylinder having a port therein which is exposed after a predetermined amount of fluid has been discharged from said first hydraulic motor and received in the displacement cylinder, and a second hydraulic motor having a piston-driven rod operably engaged with said loader arm for shifting the loader arm axially, said second hydraulic motor being in fluid communication with said port for receiving fluid therefrom when said predetermined amount of fluid has been discharged from said first hydraulic motor; and a stripper bar for removing a workpiece from said loader stud as the loader arm is axially shifted.

2. An automatic loader as recited in claim 1, wherein said loader arm has a protruding interlock plate at the end of said loader arm remote from said loader stud; and wherein said loader further includes a loader base having a circular slot for receiving said interlock plate at certain angular positions of said loader arm, and thereby preventing said loader arm from being shifted axially.

3. An automatic loader as recited in claim 1 which further comprises:
a shaft for supporting said loader arm;
a loader base for housing said shaft;
a bracket secured to said loader base;
said second hydraulic means including a hydraulic motor having a slidable piston driven rod mounted therein, said motor being secured to said bracket, and said rod being connected to said shaft; and
means for controlling said second hydraulic means to regulate axial shifting of said loader arm, which includes:
means for supplying opposed first and second spaced jets of air;
a first switch member secured to said shaft and spaced a predetermined distance from said first jet of air to provide a signal at the end of the outward movement of said arm as said switch member blocks the air from said first jet; and
a second switch member secured to said shaft and spaced a predetermined distance from said second jet of air to provide a signal at the end of the inward movement of said arm as said switch member blocks the air from said second jet.

4. An automatic loader as recited in claim 3, wherein said controlling means further comprises:
a plurality of interchangeable spacing members of varying widths supportable on said bracket adjacent to said first jet of air, each of said spacing members having an orifice in alignment with said first jet of air for effectively extending the position of said first jet of air to limit the axial outward shifting of said arm so that workpieces of varying widths can be ground and unloaded without changing the position of said first jet of air.

5. An automatic loader for a concentric grinding machine for grinding ring-like workpieces, which comprises:
a swinging-type loader arm having a loader stud for supporting a workpiece, said arm being positioned in seriatim at a loading station, a grinding station and a discharge station, said last station being angularly positioned between said loading and grinding stations;
means for loading a workpiece onto said loader stud at the loading station;
means for arcuately swinging said loader arm to the grinding station where a grinding cycle is performed;
means for arcuately returning said loader arm to the loading station after the completion of the grinding cycle;
a stripper bar positioned intermediate said grinding and loading stations; and
means for shifting said loader arm and said loader stud axially out as the loader arm passes the stripper bar during its arcuate movement toward the loading station to remove the ground workpiece therefrom in preparation for the next loading operation.

6. An automatic loader as recited in claim 5, wherein said means for shifting said loader arm and said loader stud axially is operated in response to said means for arcuately returning the loader arm so that said loader arm is moved axially out at a precise angular position.

7. An automatic loader as recited in claim 6, which further includes, means for shifting said loader arm axially inwardly at said loading station to load the next successive workpiece.

8. An automatic loader as recited in claim 5, wherein said returning means comprises, a first hydraulic motor connected to pivot said loader arm; and wherein said shifting means, comprises:
a displacement cylinder having a slidable piston mounted therein in fluid communication with the discharge of said first hydraulic motor, said displacement cylinder having a port therein which is exposed after a predetermined amount of fluid is received in the displacement cylinder from the discharge of said first hydraulic motor; and
a second hydraulic motor having a piston-driven rod for shifting the loader arm axially, said motor being in fluid communication with said port for receiving fluid therefrom when said predetermined amount of fluid has been discharged from said first hydraulic motor to remove the workpiece from said loader stud.

9. An automatic loader for a grinding machine comprising
loader means,
means for supporting said loader means for selective displacement in a first direction from a grinding station, through a discharge station, to a loading station and for selective displacement in a second direction substantially perpendicular to said first direction,
said loader means including workpiece supporting means selectively configured so that a workpiece can be removed therefrom by displacement of the workpiece relative thereto in said second direction, means for continuously displacing said loader means in said first direction from said grinding station to said loading station;

means for displacing said loader means in said second direction when said loader means is proximate said discharge station, and means for removing the workpiece from said workpiece supporting means as said loader means is displaced in said second direction.

10. An automatic loader for a grinding machine according to claim 9, wherein said loader means comprises an arm member and wherein said supporting means includes housing means and means for pivotally mounting said arm member on said housing means, said pivotally mounting means being adapted for displacement in said second direction.

11. An automatic loader for a grinding machine according to claim 10, wherein said means for displacing said loader means in a first direction comprises a hydraulic motor having a piston operably engaged with said loader arm.

12. An automatic loader for a grinding machine according to claim 11, wherein said means for displacing said loader means in said second direction comprises a second hydraulic motor including a piston operably engaged with said loader arm.

13. An automatic loader for a grinding machine according to claim 12, further comprising a displacement cylinder including a piston slidably mounted therein in fluid communication with the discharge of said first hydraulic motor, said displacement cylinder having a port selectively exposed after a predetermined amount of fluid is received from said first hydraulic motor, said port being exposed when said loading means has been displaced in said first direction to a position proximate said discharge station, said port being in fluid communication with said second hydraulic motor.

* * * * *